US012567728B2

(12) United States Patent

Hu

(10) Patent No.: US 12,567,728 B2

(45) Date of Patent: Mar. 3, 2026

(54) POWER SHARING DEVICE

(71) Applicant: Splitvolt, Inc., Santa Clara, CA (US)

(72) Inventor: Heng Hu, San Jose, CA (US)

(73) Assignee: Splitvolt, Inc., Santa Clara, CA (US)

( * ) Notice: Subject to any disclaimer, the term of this patent is extended or adjusted under 35 U.S.C. 154(b) by 714 days.

(21) Appl. No.: 17/943,097

(22) Filed: Sep. 12, 2022

(65) Prior Publication Data

US 2023/0082551 A1     Mar. 16, 2023

Related U.S. Application Data

(60) Provisional application No. 63/243,164, filed on Sep. 12, 2021.

(51) Int. Cl.
| | |
|---|---|
| *H02G 3/10* | (2006.01) |
| *B60L 53/31* | (2019.01) |
| *H01R 13/703* | (2006.01) |
| *H01R 13/713* | (2006.01) |
| *H01R 25/00* | (2006.01) |

(52) U.S. Cl.
CPC ................ *H02G 3/10* (2013.01); *B60L 53/31* (2019.02); *H01R 13/7035* (2013.01); *H01R 13/713* (2013.01); *H01R 25/006* (2013.01)

(58) Field of Classification Search
CPC ............ H02G 3/08; H02G 3/081; H02G 3/10; H02G 3/18; H02G 3/12; H01R 25/006; H01R 13/713; H01R 13/7035; H01R 27/00; B60L 53/31; B60L 53/30; B60L 53/305; B60L 53/34; B60L 53/50; H02J 3/14; H02J 2310/48; H02J 2310/50

USPC ......... 174/50, 520, 535, 17 R; 361/600, 601, 361/605, 622, 641, 679.01; 220/3.2–3.8, 220/4.02
See application file for complete search history.

(56) References Cited

U.S. PATENT DOCUMENTS

| | | | | |
|---|---|---|---|---|
| 5,821,636 A * | 10/1998 | Baker ....................... | H02J 3/38 |
| | | | | 361/601 |
| 6,410,851 B1 * | 6/2002 | Lamar ...................... | H02G 3/10 |
| | | | | 174/67 |
| 6,937,461 B1 * | 8/2005 | Donahue, IV ....... | H01R 13/514 |
| | | | | 174/59 |
| 7,511,451 B2 * | 3/2009 | Pierce ................. | H01M 50/251 |
| | | | | 361/601 |
| 7,737,360 B2 * | 6/2010 | Wiemeyer ................ | H04Q 1/13 |
| | | | | 361/679.01 |
| 8,559,167 B1 * | 10/2013 | Czarnecki ................ | H02B 1/46 |
| | | | | 174/50 |
| 8,981,716 B2 | 3/2015 | Bianco | |
| 9,090,175 B2 | 7/2015 | Bianco | |
| 9,635,773 B1 * | 4/2017 | Marshall .............. | H01R 25/003 |
| 9,770,994 B2 | 9/2017 | Bianco et al. | |

(Continued)

*Primary Examiner* — Angel R Estrada

(74) *Attorney, Agent, or Firm* — Fenwick & West LLP

(57) ABSTRACT

A power sharing device allows a single high voltage electric socket to be shared with one or more appliances and an EV charger. The device can be easily installed and used without updating the electric circuit of the dwelling. The device senses the load of the appliance socket(s) and automatically disconnects the EV charger socket if significant current is being drawn by the appliance(s). The device may also include a circuit breaker to prevent current overload of the electric circuit. These and other features of the device provide improved safety relative to existing solutions.

20 Claims, 4 Drawing Sheets

(56) References Cited

U.S. PATENT DOCUMENTS

| | | | |
|---|---|---|---|
| 10,214,115 B2 | 2/2019 | Bianco et al. | |
| 11,469,613 B2 * | 10/2022 | Waterman | B60L 53/63 |
| 11,594,850 B2 * | 2/2023 | Byrne | H01R 13/518 |
| 11,659,670 B2 * | 5/2023 | McDowell | H05K 5/10 |
| | | | 361/679.01 |

* cited by examiner

POWER SHARING DEVICE

CROSS REFERENCE TO RELATED APPLICATIONS

This application claims the benefit of U.S. Provisional Application No. 63/243,164, filed Sep. 12, 2021, which is incorporated by reference.

BACKGROUND

As Electric Vehicles (EV) becomes more popular, the need for home-charging of such vehicles is increasing. Level 1 charging, that uses standard domestic 120 volt outlets, can be painfully slow. Consequently, many users obtain level 2 chargers, which provide improved charging rates, but require a 240V (30 to 50 Amps) socket.

Residential houses constructed in North America normally provide one electrical branch circuit for operation of a clothes dryer appliance. This circuit is a high-power circuit, providing 220 VAC or 240 VAC at a maximum current rating of 30 amperes or 50 amperes. The high voltage capability of this outlet makes it desirable for electric vehicle (EV) charging. Various types of sockets may be used by the high-powered circuit, such as NEMA 6-30r, NEMA 6-50r, NEMA 10-30, NEMA 10-50, NEMA 14-30r, or NEMA 14-50r. These 240V sockets can be split into two, using a Y splitter, to connect both an electrical appliance and as EV charger. However, one must then avoid using both the appliance and EV charger at the same time, or the circuit breaker will trip, as the current draw would exceed the amount allowed by electrical codes. If the circuit breaker did not trip, it would be unsafe for the dwelling as the electric wires could overheat and start a fire.

Similar issues can arise where an owner acquires two electric vehicles. They may want to charge both vehicles overnight and unsupervised. Or they want to plug in the EV charger and the electrical appliance, but only have one high voltage socket to plug into. Furthermore, a home renter will likely not be allowed to install high voltage sockets or make any changes to the rental property's electrical system.

The above problems may be addressed by adding additional high-voltage outlets, but this conventionally requires significant work by an electrician and is thus expensive. Thus, there is a need for an affordable solution that can take an existing 240V socket and split it into two or more outlets without modifying the existing home electrical system without compromising the safety of the electrical system.

SUMMARY

The above and other problems may be addressed by a power sharing device that allows both an appliance and an EV charger to be plugged in at the same time, and then switches the electricity flow between the appliance and the EV charger automatically, preventing too much current draw occurring from both from being used at the same time. If the electrical appliance is in use, then the EV charger may be powered off. Once the electrical appliance is no longer drawing power, then the EV charger may be powered back on. This may enable a single high-voltage outlet to be shared between the appliance and the EV charger with little or no modification to the dwelling's electric circuits while remaining safe and in compliance with electrical codes.

The total current through the power sharing device may be limited by a built-in circuit breaker that trips at 80% amperage of the 240-volt circuit rating (also known as overcurrent protection). Thus, the device will not trip the circuit breaker in the building's electrical panel or draw more power than the circuit is rated for by code, even if the user tries to operate the appliance and the EV charger simultaneously.

In some embodiments, a liquid crystal display (LCD) shows live data of the voltage, power, and current going through the device. A light emitting diode (LED) light may indicate which socket currently has power and which is currently off.

DETAILED DESCRIPTION

Figure 1:
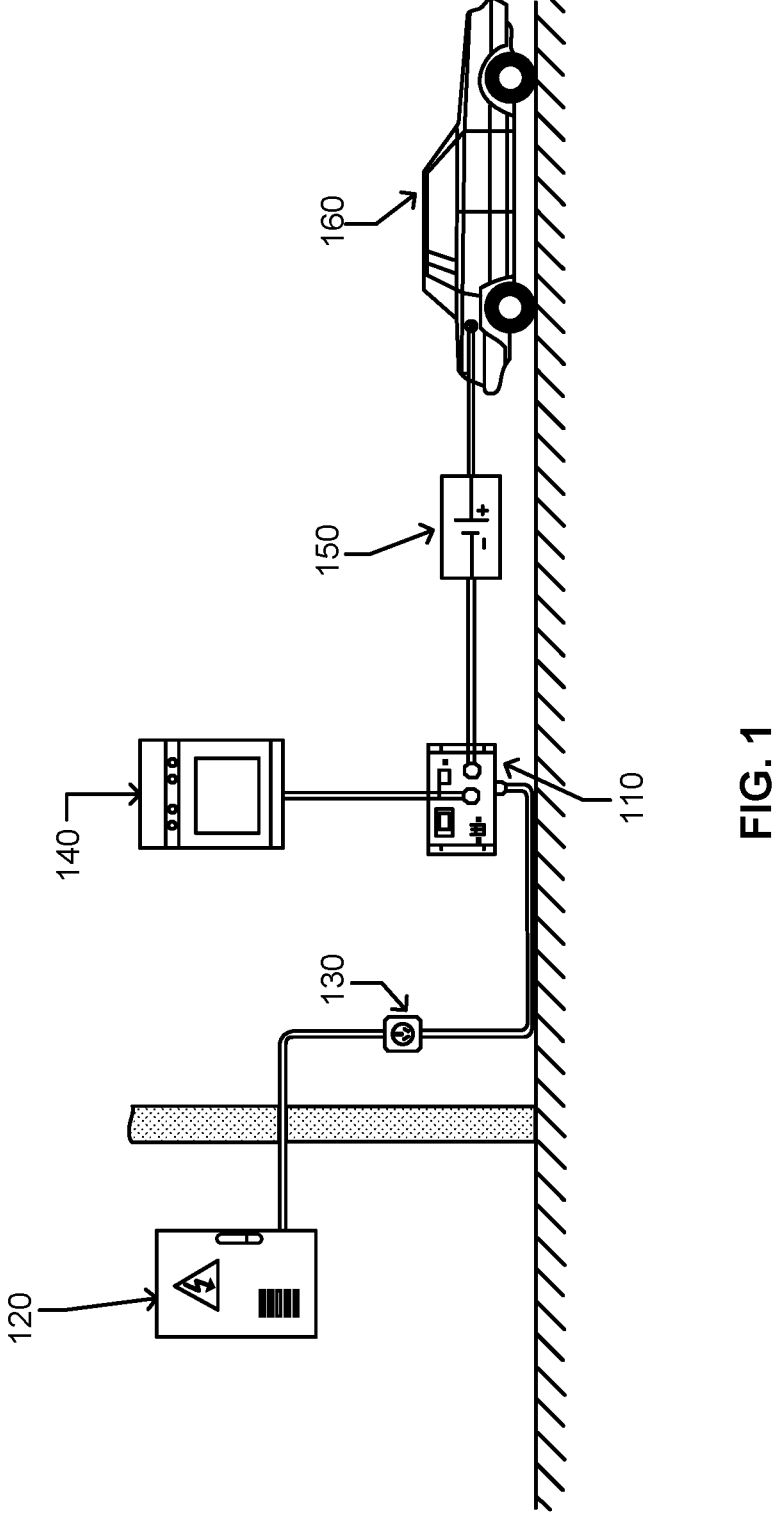
(FIG. 1 illustrates the usage of the power sharing device in a residential environment with both an electrical appliance and an EV charger connected, according to one embodiment.

The power sharing device (or "PSD") is designed to be used in any location where there is a high voltage (e.g., 240V, and 30 to 50 Amps) socket. FIG. 1 illustrates an example environment, in this case a home of an electric vehicle owner, in which the PSD 110 may be used. The environment includes a high voltage socket 130 connected to the electrical panel 120 of the home. The high voltage socket 130 is shared by one or more electrical appliances 140 and one or more EV chargers 150. The PSD 110 splits the single high voltage socket 130 into multiple outlets so that the electrical appliance 140 and the EV charger 150 (e.g., Electric Vehicle Service Equipment (EVSE)), can be plugged in at the same time.

EVs 160 are typically charged at night when electricity rates are lower, usually when other electrical appliances are not in use. However, there is the chance that a person may try to run both the EV charger 150 and the electrical appliance 140 at the same time. If this happens, the current draw exceeds the designated load on the home circuit. This should trip the circuit breaker in the main electrical panel 120. And if it does not, the amount of current drawn by running the electrical appliance 140 and the EV charger 150 at the same time presents a series risk of a fire or other electrical failure occurring.

The PSD 110 mitigates these risks by automatically controlling when the outlet for the electrical appliance 140 and the outlet for the EV charger 150 may deliver current. The PSD 110 may also include its own circuit breaker that shuts off the outlets on the PSD 110 before the total current drawn reaches a level at which the circuit breaker in the electrical panel 120 is triggered.

Figure 2:
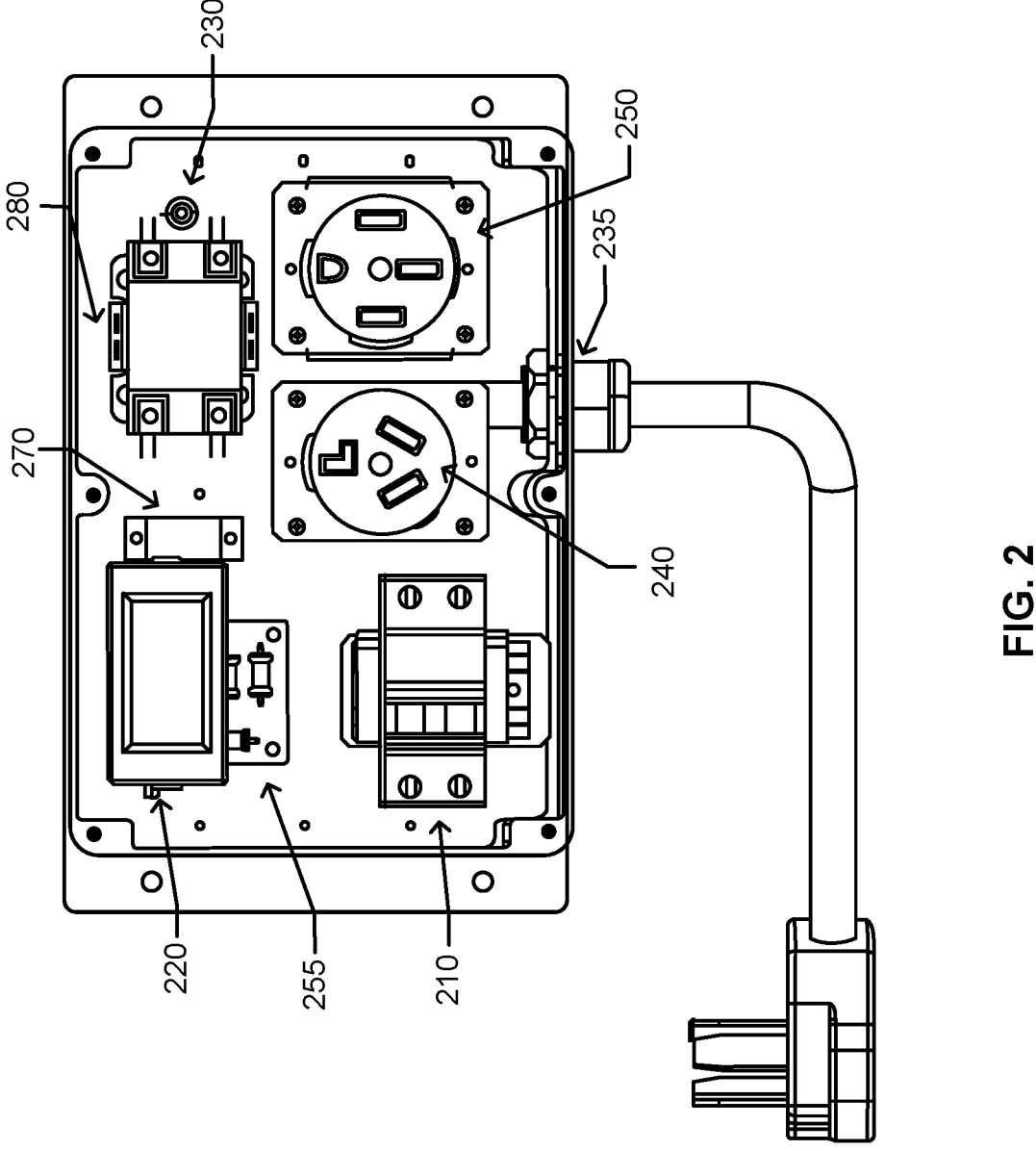
FIG. 2 illustrates a close-up of the design and components of the power sharing device, according to one embodiment.
Figure 3:
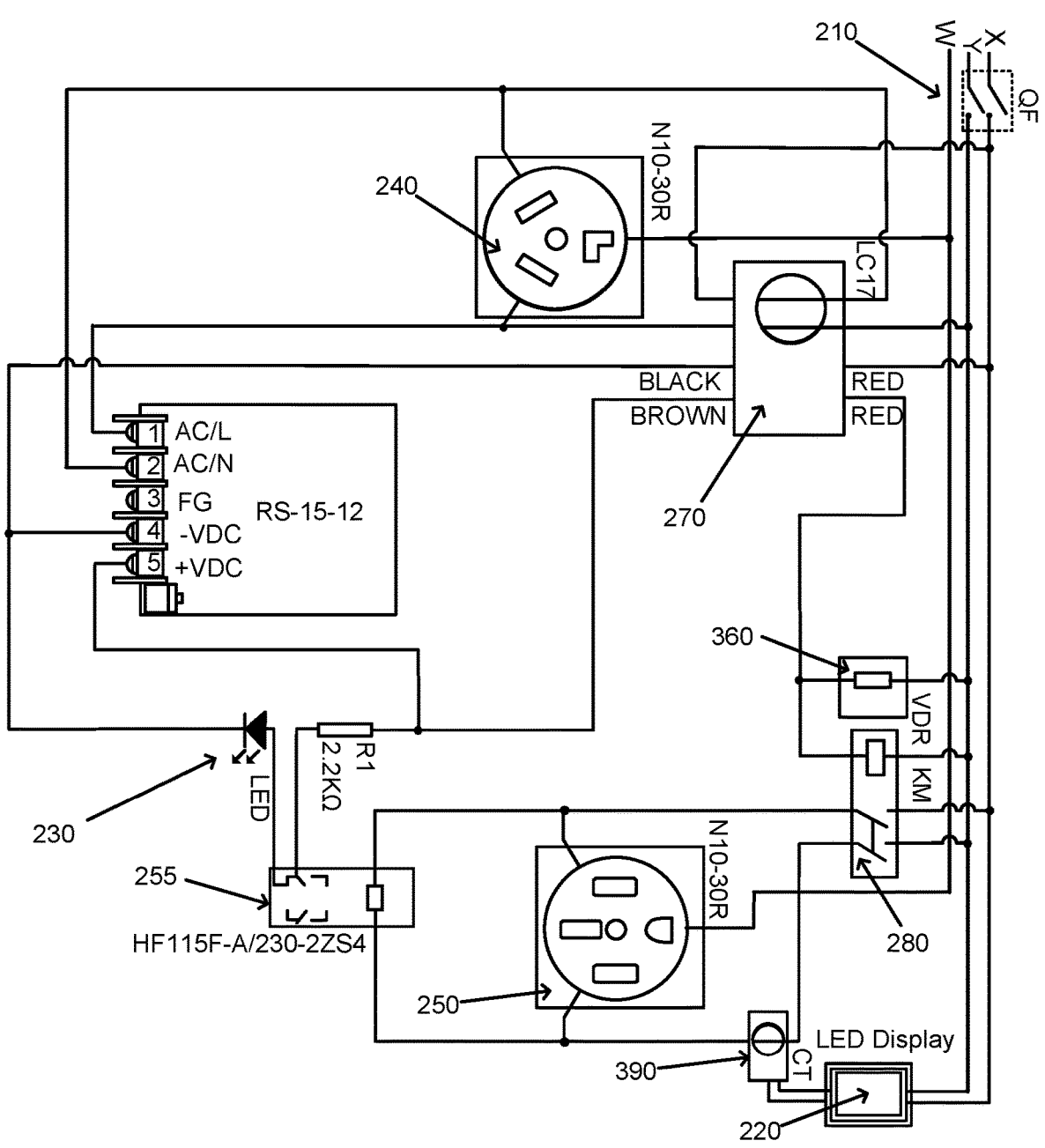
FIG. 3 is a circuit diagram of the power sharing device, according to one embodiment.

FIG. 2 is a view of components of one embodiment of the PSD 110. FIG. 3 is a corresponding circuit diagram of one embodiment of the PSD 110. The PSD 110 may connect to the high voltage socket 130 via a pigtail connector 235. In alternative embodiments, the PSD 110 may be hard-wired into the electrical system of the house rather than plugging in to a high voltage socket 130.

The PSD 110 includes an appliance socket 240 and an EV charger socket 250. In the embodiment shown, the appliance socket 240 is a NEMA 10-30 socket and the EV charger socket 250 is a NEMA 14-50 socket. However, any suitable socket types may be used (e.g., NEMA 6-30, NEMA 6-50, NEMA 10-30, NEMA 10-50, NEMA 14-30, or NEMA 14-50). Thus, the user need not purchase or use adapters to use their appliance and/or EV charger. It is generally preferable (but not required) to use a different type of socket for the appliance socket 240 and the EV charger socket 250 to prevent the appliance and EV charger accidentally being plugged into the incorrect sockets.

To prevent overloading the home circuit and provide additional safety, the PSD 110 may keep the appliance socket 240 powered on and turn off the EV charger socket 250 if a current draw above a draw threshold is detected from the appliance socket 240. Once the appliance socket is done drawing power, the EV charger socket 250 is turned back on. This function may be automated using an AC current switch 270 to detect the amount of current being drawn by the appliance socket 240. In various embodiments, the appliance socket 240 has two hot wires. The AC current switch 270 is configured to detect the total current being drawn based on both hot wires at the same time. For example, the hot wires of opposite phase may enter the AC current switch 270 from opposite ends, and thus the AC current switch 270 can detect if there is a load on the appliance socket even when just one of the two hot wire is used. In other embodiments, the PSD 110 may use other wiring configurations to enable the current detection switch 270 to detect current from one or both hot wires.

Once the AC current switch 270 detects a load on the appliance socket 240 above a draw threshold, the contactor 280 actuates to switch off the EV charger socket 250. The draw threshold may be set at a level (e.g., 0.5 amps) to enable the electrical appliance to operate in a standby mode without turning off power to the EV charger. For example, a digital display (e.g., displaying the time) may continue to operate on the appliance and user may be able to user a user interface to setup or schedule use of the appliance, with power to the EV charger only being switched off when the appliance begins to operate (e.g., when a washing machine begins a wash cycle). The contactor 280 may interact with a voltage-dependent resistor 360 to provide the described functionality.

Once the AC current switch 270 detects that the load on the appliance socket 240 has dropped below the draw threshold, the contactor 280 may be actuated again, restoring power to the EV charger socket 250. In some embodiments, power is not restored to the EV charger socket 250 until the load drops below the draw threshold for a predetermined amount of time (e.g., one second). This may prevent the EV charger socket 250 switching rapidly between having power and not having power as the amount of current drawn by the appliance varies during operation of the appliance. For example, when a dryer starts up, the amount of current drawn is typically unstable in the initial part of the dryer cycle, and the amount of current drawn dropping briefly below the corresponding draw threshold should not be used as an indication that power to the EV charger can be restored.

The PSD 110 may also have its own circuit breaker 210 to make sure no overcurrent and electrical surge occurs, providing second layer of safety. The circuit breaker 210 may be a self-contained dual thermal-magnetic circuit breaker or any other suitable type of circuit breaker. An EV owner can match the current drawn of their EV charger to 24 amps or 40 amps by configuring it in their car or EVSE. However, if the user forgets to match the EV charger's current to the correct level, then the self-contained dual circuit breaker 210 will trip, preventing the possible danger that comes from drawing more power than is permitted by the electrical code.

In one embodiment, the EV charger socket 250 is limited to a load threshold amount (e.g., 80%) of the maximum load of the high voltage socket 130 by a circuit breaker 210. This provides sufficient headroom that the main circuit breaker in the house's electrical panel 130 in unlikely to be triggered by the PSD 110. For example, if the high voltage socket 130 is a NEMA 14-30 or NEMA 10-30, the circuit breaker 210 may be set to 24 amps (80% of 30 amps) and if the high voltage socket 130 is a NEMA 14-50 or NEMA 10-50, the circuit breaker 210 may be set to 40 amps (80% of 50 amps). In the first case, the output sockets (the appliance socket 240 and the EV charger socket 250) would be limited to maximum current of 24 amps, even in cases where the output sockets could theoretically draw more current (e.g., in the EV charger socket 250 is a NEMA 14-50, which can draw up to 40 amps under the electrical code, it would still be limited to 24 amps to prevent excess current draw through the high voltage outlet 130).

The PSD 110 may have a LCD or LED display 220 that shows electric power information such as current (amps), power (KW), voltage (V), and/or total power consumed (KWH), etc. The total power consumed may be cumulative for all time that the PSD 110 has been in operation, for a specific prior time period (e.g., the previous day, month, or year), or for a current charging session (e.g., since power was last enabled for the EV charging socket 250). The current provided to the display 220 may be controlled by a current transformer 390. This PSD 110 may have one or more LEDs 230 that indicate if there is current being drawn by the EV charger socket 250 and/or appliance socket 240.

This PSD 110 may have a set of components 255 to reduce the voltage to the LED 230 allowing the LED 230 to stay cool and/or to power other internal components.

Figure 4:
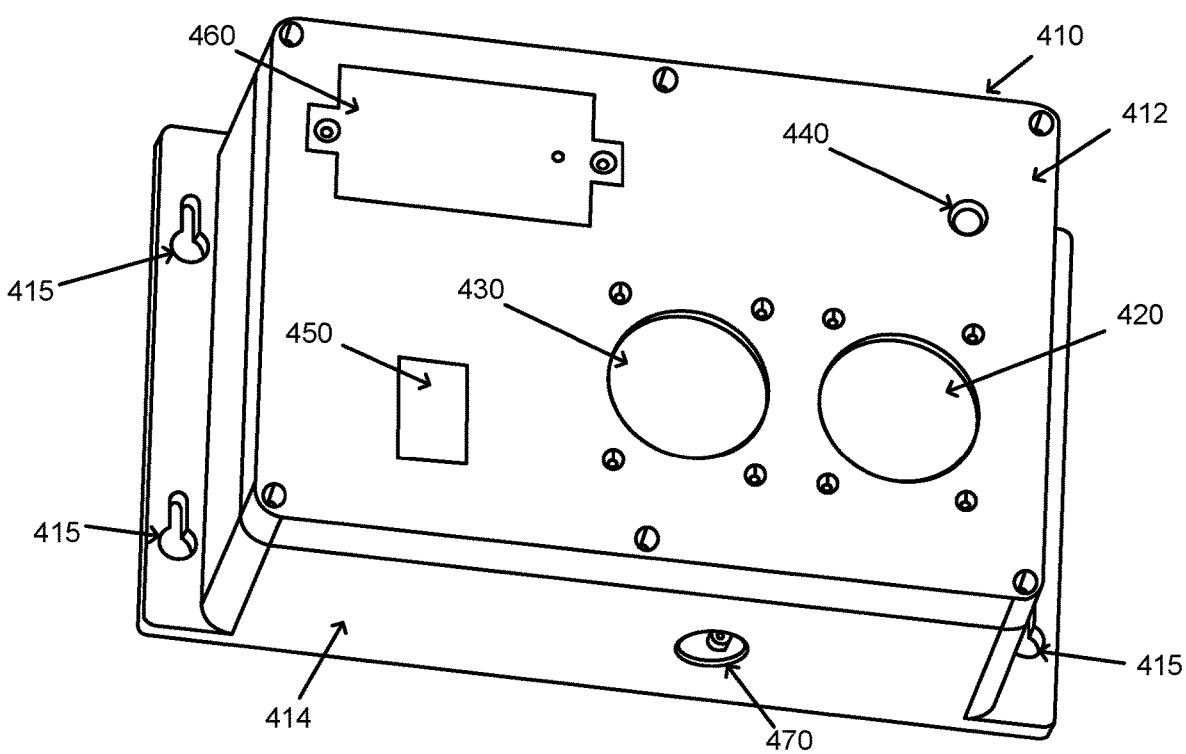
FIG. 4 is a perspective view of the housing of the power sharing device, according to one embodiment.

FIG. 4 illustrates one embodiment of a housing 410 of the PSD 110. In the embodiment shown in FIG. 4, the housing 410 includes a front plate 412 and an enclosure 414. The enclosure 414 includes a pair of flanges with mounting holes 415 that enable wall mounting. Mounting the PSD 110 on a wall above the ground provides safety from flooding. The housing 410 can be made of any suitable material, but low-flammability materials that will not melt or burn quickly in the event of an electrical failure are preferable.

In one embodiment, the housing 410 includes four mounting holes 415 for mounting the PSD 110 onto at least one wall stud for sturdiness. Keyhole mounting holes 415 may be used to allow tools-free, fast mounting and dismounting from the wall. The top plate 412 also includes a first opening 420 for the EV charger socket, a second opening 430 for the appliance socket 240, a third opening 440 through which the LED 230 may be viewed, a fourth opening 450 through which a manual switch of the circuit breaker 210 may protrude, and a mounting region 460 for the display 220. The manual switch of the circuit breaker 210 may be used to cut power from the outlets of the PSD 110 (e.g., in an emergency or to enable safe maintenance of the PSD). The enclosure 414 includes a fifth opening 470 through which the power connection to the high voltage socket 130 passes. Having the power connection pass through the fifth opening 470 provides a clear orientation for the PSD 110. If the power connection passes through the bottom of the enclosure 414, then the appliance socket 240 and the EV charger socket 250 will also be correctly aligned such that when the appliance and EV charger are plugged into them, the cables and sockets are not placed under undue stress.

Figure 5:
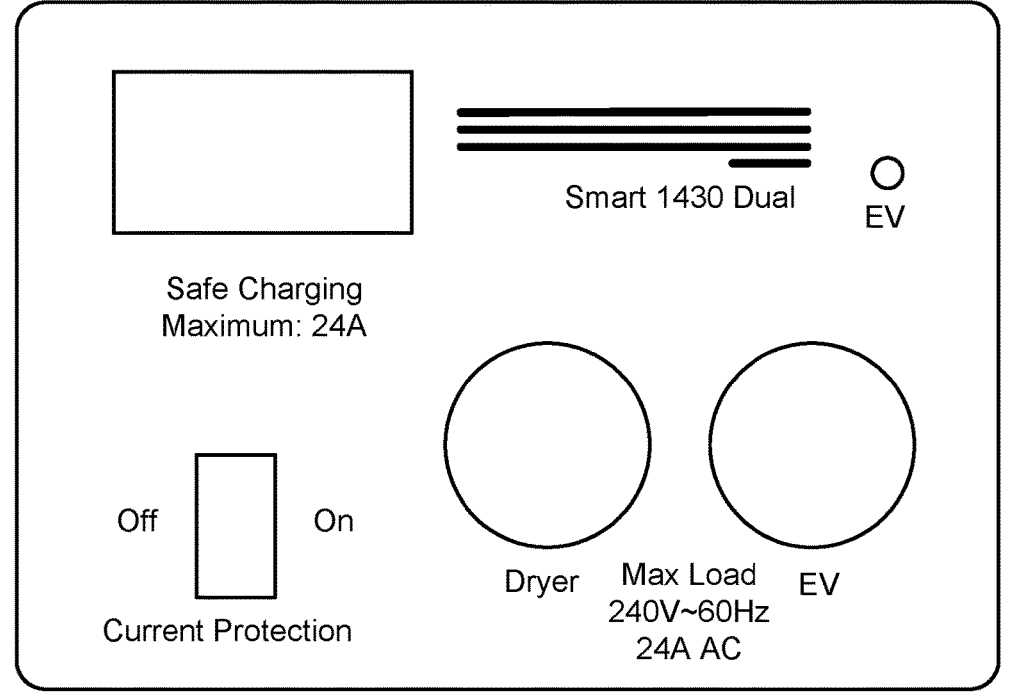
FIG. 5 is a front view of the front panel of the power sharing device, according to one embodiment.

FIG. 5 is a view of the front plate 412 of the housing 410. As can be seen in FIG. 5, the front plate 412 can include text indicating the safe maximum load of the PSD 110 as well as the intended operating voltage and frequency. It should be appreciated that a wide range of designs and configurations are possible for the PSD 110 without deviating from the disclosed principles.

Any reference above to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for sharing a single high voltage socket between one or more appliances and one or more EV chargers. Thus, while particular embodiments and applications have been illustrated and described, it is to be understood that the described subject matter is not limited to the precise construction and components disclosed. The scope of protection should be limited only by the following claims.

What is claimed is:

1. A power sharing device comprising:
a housing;
a power input that connects to a high voltage socket;
an electric vehicle charging socket mounted within the housing;
an appliance socket, mounted within the housing, having a first hot wire and a second hot wire within the housing; and
an alternating current switch, disposed within the housing, connected to both the first hot wire and the second hot wire, wherein the alternating current switch causes disconnection of power to the electric vehicle charging socket responsive to an amount of current in the first hot wire and the second hot wire exceeding a draw threshold without causing disconnection of power to the appliance socket.

2. The power sharing device of claim 1, wherein the housing comprises a front plate and an enclosure.

3. The power sharing device of claim 2, wherein the front plate includes a first opening through which the electric vehicle charging socket protrudes and a second opening through which the appliance socket protrudes.

4. The power sharing device of claim 2, wherein the enclosure comprises one or more flanges, the flanges defining mounting holes with which the enclosure can be mounted to a wall.

5. The power sharing device of claim 4, wherein the mounting holes are keyhole mounting holes that enable tool-free mounting and unmounting of the enclosure to the wall.

6. The power sharing device of claim 1, further comprising a display, mounted on the housing, that displays one or more of: a current being delivered by the power sharing device, a power being delivered by the power sharing device, a voltage being delivered by the power sharing device, or a total power delivered by the power sharing device.

7. The power sharing device of claim 1, further comprising a light emitting diode, viewable through an opening in the housing, that indicates if current is being drawn by the electric vehicle charging socket and/or the appliance socket.

8. The power sharing device of claim 1, wherein the alternating current switch causes disconnection of power to the electric vehicle charging socket by causing actuation of a connector electrically positioned between the power input and the electric vehicle charging socket.

9. The power sharing device of claim 1, wherein the draw threshold is approximately 0.5 amps.

10. The power sharing device of claim 1, further comprising a circuit breaker configured to cut power to the electric vehicle charging socket and the appliance socket responsive to a total being drawn by the power sharing device exceeding a draw threshold.

11. The power sharing device of claim 10, wherein the draw threshold is 80% of a maximum load of the high voltage socket.

12. The power sharing device of claim 10, wherein the draw threshold is approximately 24 amps.

13. The power sharing device of claim 10, wherein the circuit breaker includes a manual switch that, when actuated, cuts power to the electric vehicle charging socket and the appliance socket.

14. The power sharing device of claim 1, wherein power is returned to the electric vehicle charging socket responsive to the amount of current in the first hot wire and the second hot wire dropping below the draw threshold.

15. The power sharing device of claim 1, wherein power is returned to the electric vehicle charging socket responsive to the amount of current in the first hot wire and the second hot wire dropping below the draw threshold for a threshold amount of time.

16. The power sharing device of claim 15, wherein the threshold amount of time is approximately one second.

17. The power sharing device of claim 1, wherein the power input includes a pigtail connection mounted on a bottom surface of the housing.

18. The power sharing device of claim 1, wherein the electric vehicle charging socket and the appliance socket are each selected from a group consisting of: NEMA 6-30, NEMA 6-50, NEMA 10-30, NEMA 10-50, NEMA 14-30, and NEMA 14-50.

19. The power sharing device of claim 1, wherein the electric vehicle charging socket and the appliance socket are different types of socket.

20. The power sharing device of claim 1, wherein the first hot wire and the second hot wire are connected to opposite sides of the alternating current switch.

* * * * *